Patented July 28, 1925.

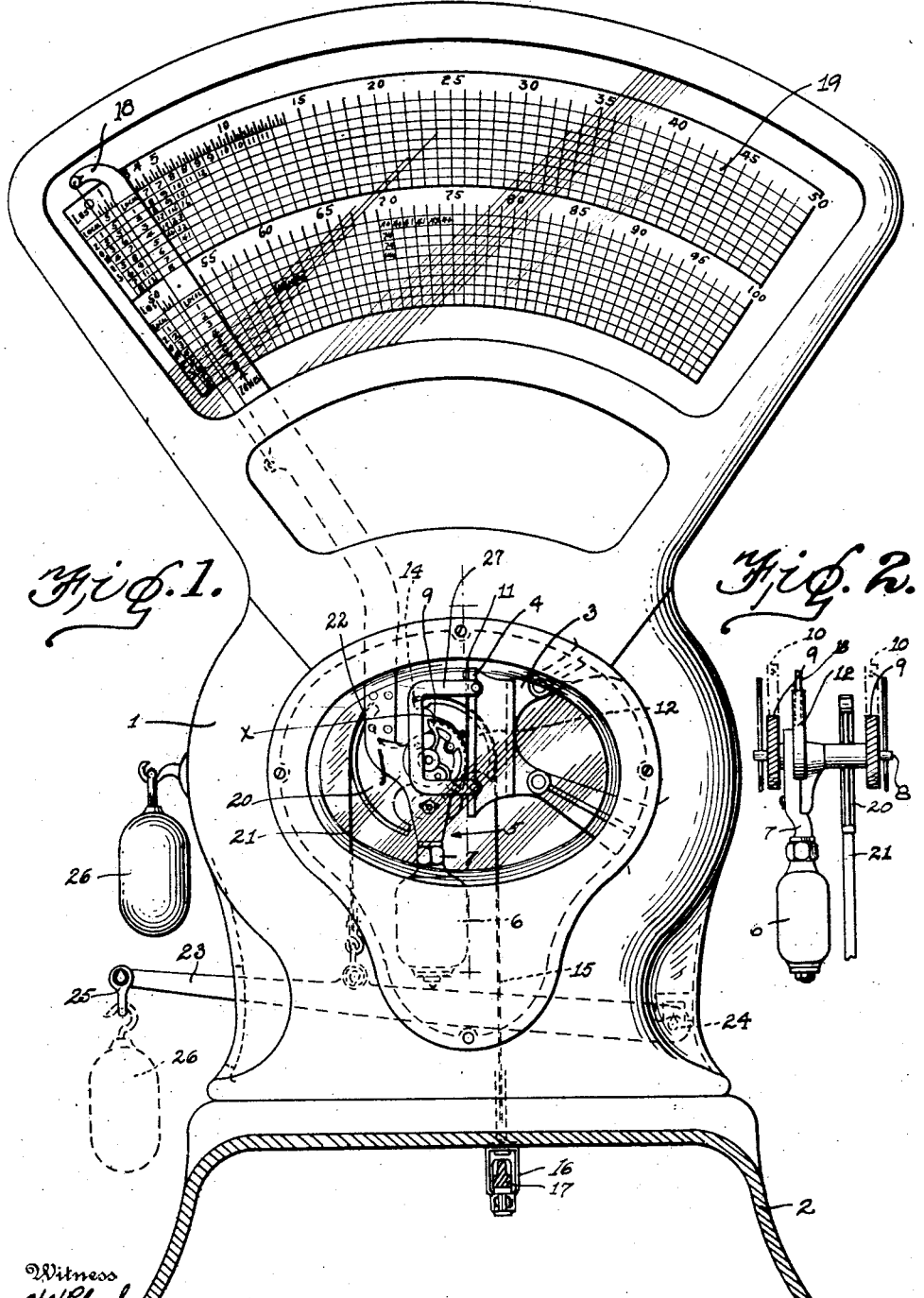

1,547,321

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

WEIGHING MECHANISM.

Application filed December 10, 1919. Serial No. 343,853.

*To all whom it may concern:*

Be it known that I, CLARENCE H. HAPGOOD, a citizen of the United States, residing at Toledo, in the county of Lucas and State of Ohio, have invented certain new and useful Improvements in Weighing Mechanism, of which the following is a specification.

This invention relates to weighing scales and particularly that type of weighing scales in which the load is offset by an outwardly swinging weight or pendulum.

One of the objects of the invention is to provide a scale having a pendulum which has an index rigidly connected thereto and which, instead of being pivoted upon a rigid bearing, is suspended by a flexible member.

Another object is the provision of a scale having a single floating pendulum so arranged that an indicating hand may be connected thereto without the interposition of transmission mechanism.

Another object is the provision of a scale having a single floating pendulum with an index connected thereto and a capacity-increasing device connected to said pendulum, which scale is provided with a chart having graduations to show the load offset by the weight-offsetting pendulum and also graduations showing the total weight offset by the pendulum and the capacity-increasing device.

With the above and other objects in view which will readily appear as the invention is better understood, my invention consists in the novel construction, combination and arrangement of parts to be hereinafter more fully described and particularly pointed out in the appended claims.

Reference is to be had to the accompanying drawings illustrating a preferred embodiment of my invention and wherein similar reference numerals designate similar parts throughout the several views.

In the drawings:—

Figure 1 is a front elevation of the housing of a scale embodying my invention, part of the weighing mechanism and indicating mechanism being shown in dotted lines, and the base being shown in section; and Figure 2 is a side elevation of the pendulum and parts attached thereto.

Referring to the drawings in detail, the weighing mechanism is contained in the housing 1, which in turn is supported upon a base 2 containing the platform lever mechanism (not shown). Projecting inwardly from one side of the housing is a bracket 3 supporting a pair of rails or guides 4 having surfaces which lie substantially in a vertical plane through the transverse center of the housing. The guides 4 will be hereinafter termed sector guides.

The load-offsetting device consists essentially of a pendulum 5 having a heavy bob 6 adjustably mounted on a stem 7. A transverse shaft 8 projects through the upper end of said stem, and carried upon the said shaft at the ends thereof is a pair of sectors 9, the outer surfaces of which are curved about an axis coinciding with the axis of the shaft 8. These sectors will hereinafter be termed fulcrum sectors.

A pair of flexible bands or ribbons 10, preferably of steel, serve to support the pendulum. Each of these ribbons is connected, as at 11, to one of the sector guides and extends downwardly over the face of the guide, lying between the guide and the fulcrum sector and having its lower end attached to the lower end of the fulcrum sector.

A third sector 12 is carried by the shaft 8 and extends between the fulcrum sector guides. The surface of the sector 12 is a portion of a true cylinder, but its center is not coincident with the axis of the shaft 8. The sector 12 may be adjusted about the shaft 8 and held in adjusted position by means of a clamping nut.

Connected, as at 14, to the upper end of the sector 12 and overlying the face thereof is a flexible steel band or ribbon 15, the lower end of which is connected to a stirrup 16 which supports the nose 17 of the main platform lever. It is apparent that when a pull is exerted upon the ribbon 15 by reason of a load being placed upon the platform of the scale, the pendulum 5 will swing outwardly and upwardly, the fulcrum sectors 9 rolling up their ribbons 10 which lie against the fulcrum sector guides 4. It will be observed by inspection of Figure 1 that the center of the power sector 12 is so placed that the point from which the ribbon 15 pulls approaches the surface of the fulcrum sectors as the pendulum swings upwardly, whereby the multiplication of the weighing mechanism is progressively increased. Owing to this construction, the angular movement of the pendulum is substantially the same throughout the capacity of the scale for each equal increment of platform load.

An indicating hand 18 is rigidly attached to the pendulum. As the pendulum swings to balance the load the hand moves over the face of the chart 19. In scales having the indicator hand fixed to a pendulum fulcrumed on a knife edge pivot the reading line on the indicator hand and the graduations on the chart may be radially arranged with respect to the pendulum pivot. In applicant's structure no point on the indicator moves in an arc of a true circle. It has been found, however, that the curved lines in which the several points on the indicator hand move closely approximate arcs of true circles having a common center X substantially midway between the mid-point of the face of the fulcrum sector 9 and the point on the guide 4 against which the fulcrum sector lies when the scale is at half capacity. The movement during a weighing operation of the point on the pendulum which coincides with the center X when the scale is at zero is so slight that the point is substantially neutral. The graduations on the chart and the reading line on the indicator hand may therefore radiate from this point and the value indications on the chart may be arcuately arranged with respect thereto.

Since the movement of the indicator hand is the same for each equal increment of platform load throughout the capacity of the chart, the graduations on the chart may be evenly spaced. The chart is provided with two sets of graduations, for a purpose which will later appear. The characters on the chart illustrated in Figure 1 are for the computation of parcel post rates, but the indicator is obviously adapted for co-operation with any type of computing or non-computing fan type chart. I have thus provided the floating pendulum with an index hand rigidly attached thereto and arranged to directly indicate the weight offset by the pendulum.

A fourth sector 20 concentric with but extending oppositely from the fulcrum sectors is mounted on the shaft 8, and a ribbon 21 is attached at 22 to the upper end of the sector 20 and overlies a portion of the curved face thereof. The lower end of the ribbon 21 is connected to a lever 23 fulcrumed in the housing, as at 24. The outer end of the lever 23 projects from the scale housing and carries a clevis 25 adapted to support a poise 26. The parts of the scale are so proportioned and adjusted that the weight of any load within the offsetting capacity of the pendulum will be correctly indicated on the upper set of chart graduations, the poise 26 being removed from the clevis 25. When it is desired to weigh a load greater than the capacity of the chart, the poise 26 is hung in the clevis 25, as shown in dotted lines in Figure 1, and when in this position serves to offset a part of the load, the weight of which is equal to the capacity of the upper chart, the remaining part of the load being automatically offset by the pendulum mechanism and the total weight indicated on the lower set of chart graduations.

It has been found advantageous in practice to incline the guiding surfaces of the fulcrum sector guides so that they lie at an angle of about 2° from the vertical. The ribbons 11 ordinarily lie in close contact with the guides, but in order to insure the parts remaining in position when the scale is moved or subjected to sudden shocks, I have provided a pair of substantially U-shaped guard members 27 having their bight portions extending parallel to the sector guides in position to engage the ends of the shaft 8 should the pendulum mechanism for any reason swing away from the guides.

While it will be apparent that the illustrated embodiment of my invention herein shown is well calculated to adequately fulfill the objects primarily stated, it is to be understood that the invention is susceptible to variation, modification and change within the spirit and scope of the subjoined claims.

Having described my invention, I claim:

1. In a weighing scale, in combination, load-offsetting and indicating means comprising a flexible ribbon, a floating pendulum supported thereby, said pendulum having a point of slight movement, and an index hand rigidly connected thereto and having a reading line substantially in alignment with said point.

2. In a weighing scale, in combination, a frame, a flexible member connected to said frame, a pendulum suspended by said flexible member and having a point of slight movement, and an index rigidly secured to said pendulum and having a reading line in substantial alignment with said point of slight movement.

3. In a scale, in combination, a flexible member, a floating pendulum supported thereby, and an indicator hand connected to said pendulum and having a reading line, the point of smallest movement of said pendulum being in alignment with said reading line.

4. In a scale, in combination, a flexible member, a floating pendulum supported thereby, said pendulum having a point of slight movement, a chart having graduations substantially radial to said point, and an index co-operating with said chart.

5. In a scale, in combination, a flexible member, a floating pendulum supported thereby, said pendulum having a point of slight movement, a chart having graduations substantially radial to said point and arcuately arranged thereabout, and an index co-operating with said chart.

6. In a scale, in combination, a flexible member, a floating pendulum supported thereby, said pendulum having a point of slight movement, an index secured to said pendulum and having a reading line, said point of slight movement being substantially in alignment with said reading line.

7. In a scale, in combination, a flexible member, a floating pendulum supported thereby, said pendulum having a point of slight movement, a chart having graduations substantially radial to said point and arcuately arranged thereabout, and an index secured to said pendulum and having a reading line, said point of slight movement being substantially in alignment with said reading line.

8. In a weighing scale, in combination, a frame, a sector guide attached thereto, a load-offsetting pendulum, an indicator hand rigidly connected thereto, a fulcrum sector secured to said pendulum and adapted to rock upon said sector guide, a capacity-changing lever fulcrumed upon said frame, means for connecting said lever to said pendulum, said lever being otherwise independent of the weighing mechanism of the scale and means for changing the counterbalancing effect of said capacity-changing lever.

9. In a weighing scale, in combination, a floating pendulum, an indicator hand rigidly connected thereto, and a detached weight adapted to be connected to said pendulum to offset a portion of the load on the scale and thereby increase the capacity thereof.

10. In a weighing scale, in combination, a floating pendulum, a detached poise, means for connecting said poise to said pendulum to offset a portion of the load on the scale, a chart having a set of graduations adapted to register the weight of the load offset by said pendulum only and a set of graduations adapted to register the weight of the load offset by said pendulum and said poise, and an index hand rigidly connected with said pendulum to swing over said chart.

11. In a weighing scale, in combination, a frame, a floating pendulum supported thereby, a lever fulcrumed on said frame, a connection between said lever and said pendulum, a detached poise, means for connecting said poise with said lever to offset a portion of the load on the scale, a chart having a set of graduations adapted to register the weight of a load offset by said pendulum only and a set of graduations adapted to register the weight of the load offset by said pendulum acting in conjunction with said poise, and an index hand rigidly connected to said pendulum to swing over said chart.

CLARENCE H. HAPGOOD.

Witnesses:
C. O. MARSHALL,
C. E. WILCOX.